United States Patent [19]

Idel et al.

[11] Patent Number: 4,661,584

[45] Date of Patent: Apr. 28, 1987

[54] PREPARATION OF POLYARYLENE SULPHIDE IN PRESENCE OF AMINO CARBOXYLIC ACID

[75] Inventors: Karsten Idel, Krefeld; Edgar Ostlinning, Duesseldorf; Dieter Freitag; Wolfgang Alewelt, both of Krefeld, all of Fed. Rep. of Germany

[73] Assignee: Bayer Aktiengesellschaft, Leverkusen, Fed. Rep. of Germany

[21] Appl. No.: 814,795

[22] Filed: Dec. 30, 1985

Related U.S. Application Data

[62] Division of Ser. No. 761,360, Aug. 1, 1985.

[30] Foreign Application Priority Data

Aug. 7, 1984 [DE] Fed. Rep. of Germany ....... 3428984

[51] Int. Cl.$^4$ ............................................... C08G 75/16
[52] U.S. Cl. .................................................... 528/388
[58] Field of Search ......................................... 528/388

[56] References Cited

U.S. PATENT DOCUMENTS

| | | | |
|---|---|---|---|
| 4,038,261 | 7/1977 | Crouch et al. | 528/388 |
| 4,286,018 | 8/1981 | Asakura et al. | 528/388 |
| 4,454,189 | 6/1984 | Fukata | 528/388 |

*Primary Examiner*—Harold D. Anderson
*Attorney, Agent, or Firm*—Connolly & Hutz

[57] ABSTRACT

This invention relates to optionally branched polyarylene sulphides and a process for the production thereof in a polar solvent, from 0.2 to 100 mole %, based on the aromatic dihalogen compounds, of an amino acid being added to the reaction mixture.

12 Claims, No Drawings

PREPARATION OF POLYARYLENE SULPHIDE IN PRESENCE OF AMINO CARBOXYLIC ACID

This is a division of copending application Ser. No. 761,360 filed Aug. 1, 1985.

This invention relates to optionally branched polyarylene sulphides and a process for the production thereof from alkali metal sulphides and aromatic halogen compounds in a polar solvent, from 0.2 to 100 mole %, based on the aromatic dihalogen compounds, of an amino acid being added to the reaction mixture.

Polyarylene sulphides and the production thereof are known (c.f., for example, U.S. Pat. Nos. 2,513,188; 3,117,620; 3,354,129; 3,524,835; 3,790,536, 3,839,301; 4,048,259, 4,038,260; 4,038,261; 4,038,262; 4,056,515; 4,060,520; 4,064,114; 4,282,347 and 4,116,947; DE-AS Nos. 2,453,485 and 2,453,749 and DE-OS Nos. 2,623,362; 2,623,333; 2,930,797; 2,930,710; 3,019,732; 3,030,488, 3,190,538.

A number of these publications mention the addition of inorganic or organic salts to the reaction mixture to reduce the melt flow or rather to increase the melt viscosity of the polyphenylene sulphides obtained. It is only if the melt viscosity is high enough that polyphenylene sulphides may be thermoplastically processed, for example into injection mouldings, films and fibres. Unless the above-mentioned salts are added, the polyphenylene sulphides obtained may only acquire the necessary low melt flow by separate and additional post-condensation or curing.

The salts used in the above-mentioned publications include, for example, alkali metal carboxylates (DE-AS No. 2,453,749), lithium halides or alkali metal carboxylates (DE-OS No. 2,623,362), lithium chloride or lithium carboxylate (DE-OS No. 2,623,363), alkali metal carbonates in combination with alkali metal carboxylates (U.S. Pat. No. 4,038,259), lithium acetate (DE-OS No. 2,623,333), trialkali metal phosphates (DE-OS No. 2,930,710), trialkali metal phosphonates (DE-OS No. 2,930,797), alkali metal fluorides (DE-OS No. 3,019,732), alkali metal sulphonates (U.S. Pat. No. 4,038,260), lithium carbonate and lithium borate (U.S. Pat. No. 4,030,518).

In addition, it is known from DE-OS No. 3,120,538 that polyarylene sulphides having high melt viscosities may be obtained by addition of N,N-dialkyl carboxylic acid amides to the reaction mixture.

The use of polar solvents for the production of polyarylene sulphides is also described therein.

It has now been found that, in the presence of an amino acid, preferably an aliphatic amino acid, the reaction in a polar solvent, preferably in an N-alkyl lactam, leads to polyarylene sulphides which may be thermoplastically processed directly, i.e. without a need for separate curing.

Accordingly, the present invention relates to a process for the production of optionally branched polyarylene sulphides from:

(a) from 50 to 100 mole % of aromatic dihalogen compounds corresponding to the following general formula:

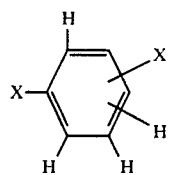

and from 0 to 50 mole % of aromatic dihalogen compounds corresponding to the following general formula:

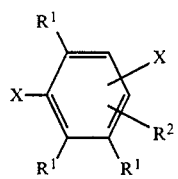

wherein

X represents halogen, such as chlorine or bromine, atoms in the meta- or para-position to one another; and $R^1$, which may be the same or different, represents hydrogen, $C_1$–$C_4$ alkyl, $C_5$–$C_{10}$ cycloalkyl, $C_6$–$C_{10}$ aryl, $C_7$–$C_{10}$ alkylaryl, $C_7$–$C_{14}$ arylalkyl, in addition to which two radicals $R^1$ in the the orthoposition to one another may be attached to form an aromatic or heterocyclic ring containing up to 3 heteroatoms, such as N, O and S, and one of the radicals $R^1$ is always different from hydrogen; and from 0 to 5 mole %, preferably from 0.1 to 2.5 mole %, based on the sum of the aromatic dihalogen compounds (I) and (II), of an aromatic trihalogen or tetrahalogen compound corresponding to the following general formula:

$$ArX_n \qquad (III)$$

wherein

Ar represents an aromatic $C_6$–$C_{14}$ radical or a heterocyclic radical containing from 5 to 14 ring atoms, up to 3 ring carbon atoms being replaceable by heteroatoms, such as N, O and S;

X represents halogen, such as chlorine or bromine; and n represents the number 3 or 4; and (c) alkali metal sulphides, preferably sodium or potassium sulphide, or mixtures thereof, preferably in the form of hydrates or aqueous mixtures, optionally together with small quantities of alkali metal hydroxides, such as sodium and potassium hydroxide, the molar ratio of (a+b):c being from 0.75:1 to 1.25:1;

(d) optionally in the presence of known catalysts, such as alkali metal carboxylates, alkali metal phosphates, alkali metal phosphonates, alkali metal fluorides, alkali metal alkyl sulphonates or N,N-dialkyl carboxylic acid amides;

characterized in that from 0.2 to 50 mole %, preferably from 0.2 to 25 mole %, based on the moles of aromatic dihalogen compound, of an amino acid is added to the reaction mixture.

It is known that the addition of aromatic polyhalogen compounds, particularly aromatic trihalogen compounds, as branching agents to the reaction mixture increases the melt viscosity of the polyarylene sulphides.

Using the process according to the present invention, it is possible to obtain high melt viscosities, even without the use of aromatic polyhalogen compounds.

The reaction time may be as long as 24 hours, but is preferably from 2 to 18 hours. The reaction temperatures are from 150° to 280° C.

The reaction may be carried out in various ways:

The alkali metal sulphides are preferably used in the form of hydrates and aqueous mixtures or aqueous solutions. Dehydration may be partial, but is preferably complete. The water present in the reaction mixture is removed therefrom by distillation. Removal of the water by distillation may be carried out directly or with the aid of azeotrope-forming agents, the aromatic dihalogen compounds preferably serving as azeotrope-forming agents. For dehydration, all the reactants may be mixed and the mixture as a whole subjected to dehydration.

The reactants are preferably combined continuously with amino acids useable in accordance with the present invention in the pressure of the polar solvent, accompanied by removal of the water. Where this procedure is adopted, the reaction may be controlled once it has started by the metering rates. Prolonged residence times of the water may thus be avoided. By comparison, for example, with the process according to DE-OS No. 3,243,189, where the water is also removed from the reaction, higher polyarylene sulphides of greater impact strength are obtained by the process according to the present invention, showing the additional advantage that they evolve fewer acidic gases on melting and are thus less corrosive, for example to processing machines.

If dehydration is complete, the reaction may be carried out in the absence of pressure or under a pressure of up to about 3 bar. High pressures of up to 50 bar may be applied to obtain higher reaction temperatures above the boiling point of the solvent or of the mixture of solvent and aromatic dihalogen and polyhalogen compounds.

The reaction mixture may be worked-up and the polyarylene sulphides isolated by known methods.

The polyarylene sulphide may be separated from the reaction solution by known methods, for example by filtration or by centrifugation, either directly or, for example, after the addition of water and/or dilute acids or organic solvents with little dissolving effect on polyarylene sulphides. Separation of the polyarylene sulphide is generally followed by washing with water. Washing or extraction with other washing liquids, which may even be carried out in addition to or after washing with water, is also possible.

The polyarylene sulphide may also be recovered, for example, by distilling off the solvent and washing as described above.

The alkali metal sulphides may also be obtained, for example, from $H_2S$ and the alkali metal hydroxides or from the hydrogen sulphides and alkali metal hydroxides.

Depending on the amount of alkali metal hydrogen sulphide in the reaction solution, which is present as an impurity in the alkali metal sulphide, certain amounts of alkali metal hydroxide may be additionally introduced. Instead of the alkali metal hydroxides, it is also possible to add compounds which split off or form alkali metal hydroxides under the reaction conditions.

According to the present invention, it is possible to use aromatic meta- and para-dihalogen compounds corresponding to general formulae (I) and (II). The ratio of aromatic meta- to para-dihalogen compound may be up to 30:70.

To obtain thermoplastically-processible polyarylene sulphides, it is particularly preferred to use aromatic p-dihalogen compounds.

If it is intended to produce branched polyarylene sulphides, at least 0.05 mole % of an aromatic trihalogen or tetrahalogen compound (III) should be used.

Examples of aromatic dihalogen compounds corresponding to general formula (I) which may be used in accordance with the present invention are p-dichlorobenzene, p-dibromobenzene, 1-chloro-4-bromobenzene, 1,3-dichlorobenzene, 1,3-dibromobenzene and 1-chloro-3-bromobenzene. They may be used either individually or in admixture with one another. 1,4-dichlorobenzene and/or 1,4-dibromobenzene are particularly preferred.

Examples of aromatic dihalogen compounds corresponding to general formula (II) which may be used in accordance with the present invention are 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,5-dichlorobenzene, 1-cyclohexyl-2,5-dichlorobenzene, 1phenyl-2,5-dichlorobenzene, 1-benzyl-2,4-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene and 1-cyclohexyl-3,5-dichlorobenzene. They may be used either individually or in admixture with one another.

Examples of aromatic trihalogen and tetrahalogen compounds corresponding to general formula (III) suitable for use in accordance with the present invention are 1,2,3-trichlorobenzene, 1,2,4-trichlorobenzene, 1,2,4-tribromobenzene, 1,3,5-trichloro-2,4,5-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobiphenyl, 1,3,5-trichlorotriazine.

Generally, various polar solvents which guarantee adequate solubility of the organic and, optionally, inorganic reactants under the reaction conditions may be used for the reaction. Preferred solvents are N-alkyl lactams.

N-alkyl lactams are those of $C_3$–$C_{11}$ amino acids optionally substituted on the carbon chain which are inert under the reaction conditions.

The N-alkyl lactams used are, for example, N-methyl-caprolactam, N-ethyl-caprolactam, N-isopropyl-caprolactam, N-isobutyl-caprolactam, N-propyl-caprolactam, N-butyl-caprolactam, N-cyclohexyl-caprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isobutyl-2-piperidone, N-methyl-6-methyl-2-piperidone, N-methyl-3-ethyl-2-piperidone.

Mixtures of the above-mentioned solvents may also be used.

Amino acids suitable for use in accordance with the present invention are preferably open-chain or cyclic aliphatic $C_1$–$C_{20}$ amino acids which may contain lateral groups, such as $C_1$–$C_4$ alkyl, $C_6$–$C_{14}$ aryl or a combination thereof, $C_1$–$C_4$ alkoxythio-$C_1$–$C_4$ alkyl or a heterocyclic $C_6$–$C_{14}$ radical containing up to 3 heteroatoms, such as N, O and S. The amino group may be present as an $NH_2$, NRH or $NR_2$ group wherein R represents an alkyl group, preferably a $C_1$–$C_4$ alkyl group. Two groups R may also be the two ends of an alkylene chain containing a lateral carboxyl group which forms a ring together with the NH group.

The amino group may be fixed in the $\alpha$-, $\beta$-, $\gamma$- or $\omega$-position. Diamino acids or aminodicarboxylic acids may also be used.

The following amino acids are mentioned by way of example: glycine, $\alpha$-alanine, $\beta$-alanine ($\alpha$- and $\beta$-aminopropionic acid), $\alpha$-aminobutyric acid, $\gamma$-aminobutyric acid, $\alpha$-aminoisovaeric acid (valine), $\alpha$-aminoisocaproic acid (leucine), $\epsilon$-aminocaproic acid, 11-aminoundecanoic acid, N-methylamino-acetic acid (sarcosine), N-methyl-$\alpha$-aminopropionic acid, N-methyl-$\beta$-aminopropionic acid, N-methyl-$\gamma$-aminobutyric acid, N-methyl-$\epsilon$-aminocaproic acid, N-methyl-11-aminoundecanoic acid, aminobutane diacid (aspartic acid), 2-aminopentane diacid (glutamic acid), 2-amino-4-methyl-thiobutane acid (methionine), phenylalanine, proline.

The reaction may also be carried out in the presence of conventional catalysts, such as alkali metal carboxylates (DE-AS No. 2,453,749), lithium halides or alkali metal carboxylates (DE-OS No. 2,623,362), lithium chloride or lithium carboxylate (DE-OS No. 2,623,363), alkali metal carbonates in combination with alkali metal carboxylates (U.S. Pat. No. 4,038,259), lithium acetate (DE-OS No. 2,623,333), trialkali metal phosphates (DE-OS No. 2,930,710), trialkali metal phosphonates (DE-OS No. 2,930,797), alkali metal fluorides (DE-OS No. 3,019,732), alkali metal sulphonates (U.S. Pat. No. 4,038,260), lithium carbonate and lithium borate (U.S. Pat. No. 4,030,518).

The polyarylene sulphides according to the present invention may be mixed with other polymers, such as pigments and fillers, for example graphite, metal powders, glass powder, quartz powder, glass fibres or carbon fibres, and may have the additives normally used for polyarylene sulphides, for example stabilizers or mould release agents, added to them.

In general, the melt flow index of polyarylene sulphides is measured in accordance with ASTM 1238-70 at 316° C. using a 5 kg weight and is expressed in g/10 minutes.

With high melt flow indices, however, this method of measurement may present difficulties on account of the high outflow rate of the polymer melt.

Because of this, the melt viscosity $\mu m$ of the polymer melt (in Pa.s) is determined at 306° C. in dependence upon the shearing force (in Pa) using an Instron rotational viscosimeter.

In this way, it is possible to determine melt viscosity over a very wide range of from $10^{-1}$ to $10^7$ Pa.s. In the Instron rheometer, the polymer is fused between a fixed plate and a rotatable cone and the torque of the cone is determined. The melt viscosity may be calculated as a function of the shearing force from the torque, the angular velocity and the equipment data. An Instron model 3250 rheometer was used: diameter of the cone and the plate 2 cm. The melt viscosity quoted is the melt viscosity measured at a shearing force $\tau$ of $10^2$ Pa.

It is also possible to analyse the polyarylene sulphides with chromatographic methods, to get informations about their molecular weight and the molecular weight distribution. Typical examples for such methods are for example high pressure liquid chromatography (HPLC), gel permeation-chromatography (GPC).

As the stationary phase may be used common commercial carrier materials, for example Li-Chroprep ®, Lobar ®, LiChrosorb ®, LiChrospher ®, Perisorb ®, Hibar ®, Fractogel ®, Fractosil ®, Ultrastyragel ®, Microstyragel ®, Zorbax ®, Bondagel ® and Shodex ®.

As solvents and eluents may be used common solvents and diluents. These solvents and diluents should dissolve the polymers sufficient. Examples are 1-chloronaphthalene, diphenyl, N-methyl-pyrrolidone, N-cyclohexyl-pyrrolidone, N-methyl-piperidone, N-methyl-caprolactame, N-methyl-laurinelactam, sulfolane, N,N'-dimethyl-imidazolidone, N,N'-dimethyl-piperazinone, hexamethyl-phosphoric-acid-triamide (NMP), 1-methyl-1-oxaphospholane and mixtures thereof.

It is possible to calibrate the analytical methods by absolute or relative standards. As reference substances for a relative calibration, usual polymers may be used as standard, for example, polystyrene, polyethylene, polyethylene-terephthalate, polybutylene-terephthalate, polyesters such as aromatic polyesters, polycarbonates, polyamides such as PA6, PA66, PA11, polysulfones and polyethersulfones.

The chromatography for the analytical determination of the molecular weights or the molecular weight distribution can be carried out at various pressures from about 1 to 10 bar.

The chromatography can be carried out within a wide temperature range from about 20° to 250° C.

Further it is possible for improvement purposes to add to the sample, which has to be analyzed, substances such as alkali halogenides, alkaline earth halogenides, phosphonium- or ammonium compounds.

By the interpretation of the so obtained analytical datas, the weight average molecular weight $M_w$ can be determined.

The weight average molecular weight $M_w$ is from 25,000 to 500,000, preferably from 25,000 to 380,000, more preferably from 25,000 to 300,000, mostly preferably from 25,000 to 150,000.

The polyarylene-sulphides have a melt viscosity of $\eta_m$ 20 to 500,000 Pa.s and an average weight relative molecular weight $M_w(rel)$ from 25,000 to 500,000 characterized in that the melt viscosity $\eta_m$ and the average weight of the relative molecular weight $M_w$ behave $$\lg \eta_m = 3.48 \cdot \lg M_w(rel) - 14.25 \pm 0.1.$$

Preferably the polyarylene-sulphides are characterized in that $\eta_m$ and $M_w$ behave $$\lg \eta_m = 3.48 \cdot \lg M_w(rel) - 14.25 \pm 0.05.$$

Immediately after isolation from the reaction mixture, the polyarylene sulphides according to the present invention generally have melt viscosities of from $0.3 \times 10^3$ to $5 \times 10^6$ Pa.s, preferably from $1.5 \times 10^3$ to $10^4$ Pa.s, and good colour properties. They may be directly processed by extrusion, extrusion blowing, injection moulding or other conventional processing techniques to form films, mouldings and fibres. The products thus obtained may be used for the conventional applications, for example as automobile components, accessories, electrical components, for example switches, electronic boards, components and apparatus resistant to chemicals and weathering, such as pump housings and pump flywheels, etching baths, sealing rings, components of office machines and communications equiment, domestic appliances, valves, ballbearing components.

EXAMPLE 1

This example describes by way of comparison the production of polyphenylene sulphide in accordance with U.S. Pat. No. 3,354,129.

129 g of sodium sulphide trihydrate (corresponding to 1 mole of $Na_2S$) and 300 g of N-methyl-2-pyrrolidone were combined in a stirrer-equipped autoclave. The mixture was purged with nitrogen and slowly heated to 202° C., a total of 19 ml of water distilling off. The mixture was then cooled to about 160° C. and 147 g of p-dichlorobenzene (=1 mole) in approx. 50 g of N-methyl-2-pyrrolidone added. The reaction mixture was then heated to 245° C. for 30 minutes under the initial nitrogen pressure of 2.5 bar, the pressure rising to 10 bar, and maintained at that temperature for 3 hours. After cooling to room temperature, a grey solid is isolated and carefully washed with water to remove organic impurities.

After drying in vacuo at 80° C., 100.3 g (93%) of poly-p-phenylene sulphide having the following characteristics are obtained: melt viscosity $\mu_m = 4.5$ Pa.s (for $\tau = 10^2$ Pa). Thermoplastic processing is not possible without curing.

EXAMPLE 2

1110 g of N-methyl-caprolactam, 323.5 g of sodium sulphide hydrate (=2.45 moles of $Na_2S$), 2.4 g of 50% sodium hydroxide, 341.1 g of 1,4-dichlorobenznee (=2.32 moles), 28.53 g of sodium acetate and 5.07 g of ε-aminocaproic acid (0.035 mole) are introduced under nitrogen into a 2 liter three-necked flask equipped with a thermometer, stirrer and a column with a distillate divider. The reaction mixture is slowly heated to boiling. Water is separated off from the distilling azeotrope consisting of water and p-dichlorobenzene and p-dichlorobenzene is returned to the reaction vessel. After 2 hours, no more water may be detected either in the distillate or in the sump. After heating under reflux for another 9 hours, the product is isolated in the form of white fibres in the conventional way by precipitation in water, acidification, washing with water to remove electrolyte and drying. The product is identified by determining its melt viscosity:

$\eta_m = 3.6 \times 10^2$ Pa.s (for $\tau = 10^2$ Pa).

EXAMPLE 3

As Example 2, except that 2.1 g of 1,2,4-trichlorobenzene (0.5 mole %, based on the moles of dihalogen benzene) are added to the reaction mixture as branching agent. Reaction and working-up as in Example 2. Melt viscosity $\eta_m = 1.8 \times 10^3$ Pa.s (for $\tau = 10^2$ Pa).

EXAMPLE 4

As Example 2, except that 4.09 g (0.035 mole) of δ-amino-butyric acid are used instead of the ε-aminocaproic acid.

Melt viscosity $\eta_m = 3.2 \times 10^2$ Pa.s (for $\tau = 10^2$ Pa).

EXAMPLE 5

Apparatus as in Example 2. 1110 g of N-methylcaprolactam 323.5 g of sodium sulphide hydrate (=2.45 moles), 28.0 g of 50% sodium hydroxide, 341.1 g of 1,4-dichlorobenzene (=2.32 moles), 2.52 g of 1,2,4-trichlorobenzene (0.5 mole %, based on the moles of p-dihalogen benzene), 30.2 g of N,N-dimethylacetamide (15 mole %) and 5.07 g (0.035 mole) of ε-aminocaproic acid. The reaction mixture is slowly heated to boiling. Water is separated off from the distilling azeotrope consisting of water and p-dichlorobenzene and p-dichlorobenzene is returned to the reaction. After 2 hours, no more water may be detected either in the distillate or in the sump. After heating under reflux for another 9 hours, the product is worked-up as in Example 2.

$\eta_m = 2.3 \times 10^3$ Pa.s (for $\tau = 10^2$ Pa).

EXAMPLE 6

As Example 2, except that 33.64 g of ε-aminocaproic acid are used and solutions of NMC (N-methylcaprolactam) and DCB (p-dichlorobenzene) and also sodium sulphide hydrate, ε-caprolactam and sodium acetate are combined and, at the same time, dehydrated. Further reaction and working-up as in Example 2.

$\eta_m = 3.6 \times 10^2$ Pa.s (for $\tau = 10^2$ Pa).

EXAMPLE 7

As Example 6, but without sodium acetate.
$\eta_m = 1.3 \times 10^2$ Pa.s (for $\tau = 10^2$ Pa).

EXAMPLE 8

As Example 6, except that 17.4 g of glycine are used instead of ε-aminocaproic acid.

$\eta_m = 2.0 \times 10^2$ Pa.s (for $\tau = 10^2$ Pa).

In contrast to Example 1, all the p-polyphenylene sulphides of Examples 2 to 8 may be directly thermoplastically processed.

A p-polyphenylene sulphide produced in accordance with Example 2 of DE-OS No. 3,243,189 (removal of the water from the reaction, no addition of an amino acid) showed a darker colour both before and after melting and evolved acidic, corrosive gaseous constituents on melting to a greater extent than the p-polyphenylene sulphides produced in accordance with the present invention.

Melting was carried out at 320° C., the acidic gases was transferred with nitrogen as entraining gas into a wash bottle filled with 1 n sodium hydroxide solution and the sodium hydroxide used and neutralized was titrimetrically determined.

| | Colour after precipitation in $H_2O$ | Colour after melting at 320° C. | Consumption in ml of 1 N NaOH after melting for 30' at 320° C. |
|---|---|---|---|
| PPS (polyphenylene sulphide) according to Example 2 of DE-OS 3,243,189 | grey-white | black | 3.1 |
| PPS according to the present invention | | | |
| Example 2 | white | brownish | 2.2 |
| Example 6 | white | brownish | 2.1 |

We claim:
1. A process for the production of high molecular weight polyarylene sulphide which comprises reacting
    (a) from 50 to 100 mole % of aromatic dihalogen compound corresponding to the following formula:

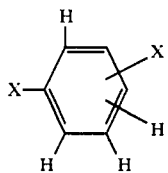

and from 0 to 50 mole % of aromatic dihalogen compound corresponding to the following formula:

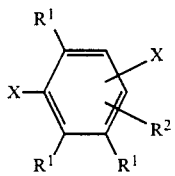

wherein

X represents halogen atoms in the meta- or para-position to one another; and each $R^1$, which is the same or different, represents hydrogen, alkyl, cycloalkyl, aryl, alkylaryl, arylalkyl, in addition to which two radicals $R^1$ in the ortho-position to one another are attached to form an aromatic or heterocyclic ring and one of the radicals $R^1$ is always different from hydrogen; and (b) from 0 to 5 mole %, based on the sum of components (a) and (b), of an aromatic trihalogen or tetrahalogen compound corresponding to the following formula:

$$ArX_n \quad \text{(III)}$$

wherein

Ar represents an aromatic or heterocyclic radical;
X represents halogen; and
n represents the number 3 or 4; and (c) alkali metal sulphide the molar ratio of (a+b):c being from 0.85:1 to 1.15:1;

(d) with or without a catalyst; in (e) a polar solvent, the molar ratio of (a):(c) being from 0.75:1 to 1.25:1 and (c):(e) from 1:2 to 1:15, the reaction time being up to 24 hours and the reaction temperatures being from 150° to 280° C., characterized in that (f) the reaction is carried out in the presence of from 0.2 to 100 mole %, based on the moles of aromatic dihalogen compound, of an amino carboxylic acid.

2. The process according to claim 1 wherein the reaction time is up to 18 hours.

3. A process as claimed in claim 1, characterized in that from 0.2 to 25 mole %, based on the moles of aromatic dihalogen compound, of an amino acid is added.

4. A process as claimed in claim 1, characterized in that aliphatic amino acid is used.

5. A process as claimed in claim 1, characterized in that glycine, α-alanine β-alanine, γ-aminobutyric acid, ε-aminocaproic acid, 11-aminoundecanoic acid or N-methylated derivatives thereof are used.

6. A process as claimed in claim 1, characterized in that any water-containing reactant is completely dehydrated and the reaction is carried out in the absence of pressure or under a low pressure.

7. A process as claimed in claim 1, characterized in that the reactants and the polar solvent are combined either individually or in the form of mixtures or solutions at temperatures of $\geq 200°$ C., accompanied by dehydration, and reacted.

8. A process as claimed in claim 1, characterized in that N-methyl-ε-caprolactam is used as the polar solvent.

9. A process as claimed in claim 1, characterized in that 1,4-dichlorobenzene is used as the aromatic dihalogen compound (I).

10. A process as claimed in claim 1, characterized in that 1,2,4-trichlorobenzene is used as the aromatic polyhalogen compound (III).

11. A process for the production of high molecular weight polyarylene sulphide with a melt viscosity of $\eta_m$ 20 to 500,000 Pascal-seconds and an average weight relative molecular weight $M_w$(rel) as determined by chromatography of from 25,000 to 500,000 characterized in that the melt viscosity $\eta_m$ and the average weight of the relative molecular weight $M_w$ behave $$\lg n_m = 3.48 \cdot \lg M_w(\text{rel}) - 14.25 \pm 0.1$$

which comprises reacting (a) from 50 to 100 mole % of aromatic dihalogen at least one compound corresponding to the following formula:

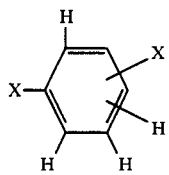

and from 0 to 50 mole % of aromatic dihalogen at least one compound corresponding to the following formula:

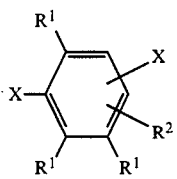

wherein

X represents halogen atoms in the meta- or para-position to one another; and each $R^1$, which is the same or different, represents hydrogen, alkyl cycloalkyl, aryl, alkylaryl, arylalkyl, in addition to which two radicals $R^1$ in the ortho-position to one another are attached to form an aromatic or heterocyclic ring and one of the radicals $R^1$ is always different from hydrogen; and (c) alkali metal sulphide, the molar ratio of (a+b):c being from 0.85:1 to 1.15:1;

(d) with or without a catalyst; in (e) a polar solvent, the molar ratio of (a):(c) being from 0.75:1 to 1.25:1 and (c):(e) from 1:2 to 1:15, the reaction time being up to 24 hours and the reaction temperatures being from 150° to 280° C., characterized in that (f) the reaction is carried out in the presence of from 0.2 to 100 mole %, based on the moles of aromatic dihalogen compound of an amino carboxylic acid.

12. The process according to claim 11 wherein the reaction time is up to 18 hours.

* * * * *